United States Patent

Shively

[15] 3,701,976

[45] Oct. 31, 1972

[54] FLOATING POINT ARITHMETIC UNIT FOR A PARALLEL PROCESSING COMPUTER

[72] Inventor: Richard Robert Shively, Convent Station, N.J.

[73] Assignee: Bell Telephone Laboratories, Incorporated, Murray Hill, Berkeley Heights, N.J.

[22] Filed: July 13, 1970

[21] Appl. No.: 54,522

[52] U.S. Cl.................................340/172.5, 235/168

[51] Int. Cl.............................G06f 15/16, G06f 7/38

[58] Field of Search ............340/172.5; 235/156, 159

[56] References Cited

UNITED STATES PATENTS

| | | | |
|---|---|---|---|
| 3,537,074 | 10/1970 | Stokes | 340/172.5 |
| 3,541,516 | 11/1970 | Senzig | 340/172.5 |
| 3,037,701 | 6/1962 | Sierra | 235/159 |

OTHER PUBLICATIONS

Robert L. Davis, " The Illiac IV Processing Element," IEEE Transactions on Computers, Vol. C- 18, No. 9, Sept. 1969

*Primary Examiner*—Paul J. Henon
*Assistant Examiner*—Ronald F. Chapuran
*Attorney*—R. J. Guenther and William L. Keefauver

[57] ABSTRACT

A digital array data processor having a plurality of substantially identical processing units is described. Each processing unit includes a floating point arithmetic unit which performs arithmetic operations based on control signals sent on a common bus to each processing unit. The arithmetic unit further includes a single step combinatorial shifting circuit for aligning and normalizing operands.

11 Claims, 10 Drawing Figures

INVENTOR
R. R. SHIVELY
BY William Ryan
ATTORNEY

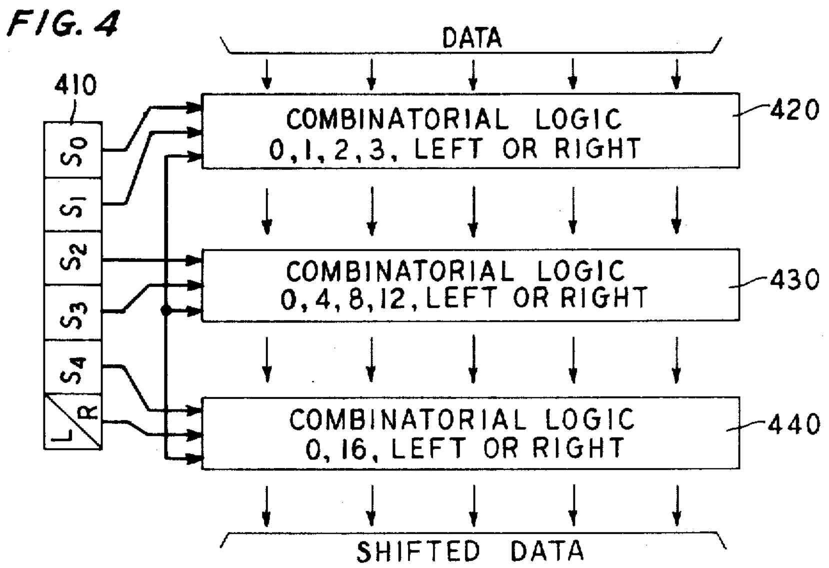
FIG. 5
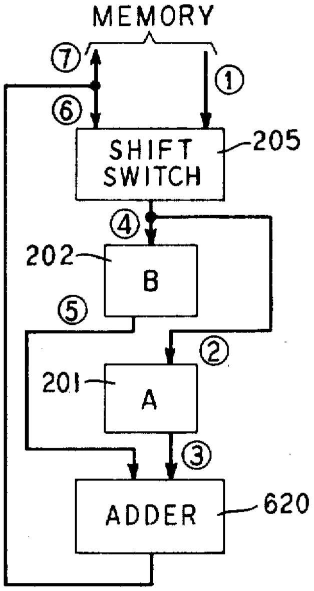
FIG. 7
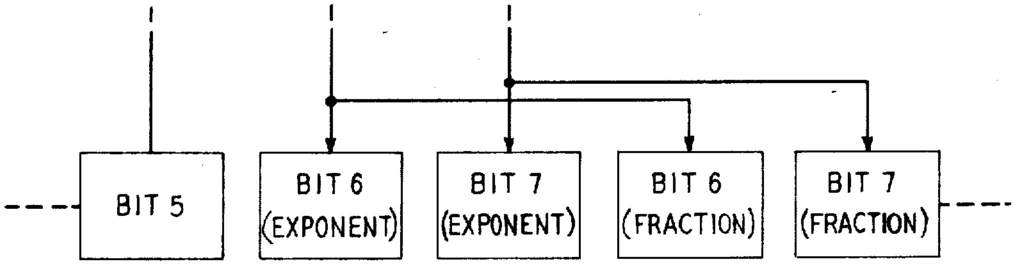

FLOATING POINT ARITHMETIC UNIT FOR A PARALLEL PROCESSING COMPUTER

GOVERNMENT CONTRACT

The invention herein claimed was made in the course of or under a contract with the Department of the Army.

FIELD OF THE INVENTION

This invention relates to data processing systems. More particularly, this invention relates to data processing systems having a plurality of individual processors. Still more particularly, the present invention relates to multiprocessor data processors having an improved floating point arithmetic unit.

BACKGROUND OF THE INVENTION

Among the many classes of data processing systems which have been developed in recent years, those having a plurality of individual data processing elements, i.e., multiprocessors, have been found useful in a wide range of applications. A special class of these multiprocessing systems is that known as parallel processors. Parallel processing systems in general provide for a plurality of individual processors simultaneously performing various tasks within an overall problem. A still more specialized class of parallel processors is that including the so-called array processors. In this class one stream (or a small number of streams) of instructions controls a number of more or less synchronized processing units, each operating upon a particular element in a data array. Typical of such machines is the ILLIAC IV, described for example, in Barnes et al. "The ILLIAC IV Computer" IEEE Trans. EC, Aug. 1968, pp. 746–757.

Arithmetic units especially adaptable for use in one or more of the various multiprocessor environments have been described, for example, in Huttenhoff and Shively "Arithmetic Unit of a Computing Element in a Global Highly Parallel Computer" IEEE Trans. EC, Aug. 1969, pp. 695–698. Details of arithmetic units, and more comprehensive configurations as well, within the framework of multiprocessor computer systems have been described, for example, in U.S. Pats. Nos. 3,444,525, issued to J. P. Barlow et al. on May 13, 1969; 3,348,210, issued to B. P. Ochsner on Oct. 17, 1967; and 3,229,260, issued to A. D. Falkoff on Jan. 11, 1966. Further details of such system are described in British patent specifications 1,162,457 published Aug. 27, 1969; 1,170,587 published Nov. 12, 1969; and 1,183,158 published Mar. 4, 1970.

Other background information on the general class of data processing systems treated here may be found in Crane and Githens, "Bulk Processing in Distributed Logic Memory," IEEE Trans. EC, Apr. 1965, p. 186–196; Githens, "A Fully Parallel Computer for Radar Data Processing," NAECON Conference Proceedings, May 1970. An application of a processor of the general type herein described is disclosed in Bergland and Wilson "A Fast Fourier Transform Algorithm for a Global Highly Parallel Processor," IEEE Trans. Audio and Electronics, June 1969, pp. 125–127.

An important problem in many multiprocessor systems, especially those of the parallel or array variety, relates to the scaling of data to be processed by each of the several processors. In particular, in those machine configurations in which data are stored in a memory uniquely associated with each individual processor, or in which a portion of a larger memory is dedicated to a particular processor, it has proven convenient for purposes of economy of storage to employ a universal or global scale vector which is implicitly included in numerical values stored in all or a substantial number of individual processors. This is the so-called "block floating vector" described in Wilkinson, Rounding Errors in Algerbraic Processes, Prentice Hall, 1963, p. 26. Such a technique was described in the Huttenhoff and Shively reference, supra. A difficulty arises in such simplified systems, however, when the data stored in the various processors is of varying accuracy, i.e., is represented by numbers having a varying number of significant digits. Thus, if a particular value for a variable is represented by a large number of significant digits, it may necessitate processing of all digits in corresponding numbers in all processors, even though they may have reduced accuracy. Similarly, absolute values may vary from one processor to another. Thus a particular processor may have variable values associated with it which tend to overflow the capacity of storage devices provided at that processor. Thus, rescaling and other measures are required at that particular processor. Meanwhile, however, other processors in the same multiprocessor system may be dealing only with variable values of much smaller magnitude. The technique of using a modified (more local) "global" scale vector can also cause some loss of accuracy and introduce other processing difficulties.

In those systems using floating point arithmetic it is recognized that shifting of operands (to align radix points prior to adding, e.g.) is a common requirement. This is typically accomplished using one or more shift registers to effect a bit-by-bit shifting of one or more operands — a time-consuming process.

Most arithmetic units operate on operands which are full memory words, i.e., the operands are usually stored one to a memory location. This is quite wasteful of storage capacity. The Huttenhoff-Shively reference, supra, treats of a system including means for operating on packed memory words. These words, however, are not floating point words. Further, time-consuming bit-by-bit shifting functions are still required.

It is therefore a general object of the present invention to overcome the various limitations and processing difficulties inherent in the prior art systems described above.

It is a further object of the present invention to provide in a parallel processing computer system means for variable representation and storage which is independent as between the several processing elements.

It is a further object of the present invention to provide a high-speed arithmetic unit for use in a parallel ensemble of processing elements.

It is a further object of the present invention to provide a high-speed arithmetic unit for use in a wide range of computers which permits floating point arithmetic to be performed on efficiently stored packed operands.

It is still a further object of the present invention to provide a floating point arithmetic unit which eliminates the need for bit-by-bit shifting to align operands and perform other conversions on packed data items.

SUMMARY OF THE INVENTION

Briefly, in accordance with one illustrative embodiment of the present invention, there is provided a plurality of individually selectable processing elements, each of which is capable of performing a sequence of operations on data stored in a corresponding local memory under the control of a single global control unit. Each processing element therefore includes means for storing data to be processed by that element and an arithmetic unit for actually performing the data processing required. Data are stored and processed in full floating point format. The design of the arithmetic unit and other processing element components is especially adaptable to integrated electronics techniques because each processor is identical.

Means are provided for packing data in each local memory to provide for the most efficient use of each memory word. Efficiently specified boundaries of the packed data items are utilized to facilitate data retrieval and storage.

The system architecture, including an associative memory facility, permits a number of standard operations to be performed in a novel and efficient manner in all (or some subset less than all) of the processing elements.

A shifting circuit is cooperatively utilized in a novel manner with more typical arithmetic unit elements to reduce the complexity of the arithmetic unit and reduce the time required to perform floating point arithmetic. Additionally, the arithmetic unit includes a normalization encoder which together with the shifting circuit previously mentioned provides for the normalization of results of arithmetic operations performed by other portions of the arithmetic unit.

Each processing element conveniently includes an associative correlation unit to facilitate selection of particular processing elements for participation in the execution of broadcast instructions.

BRIEF DESCRIPTION OF THE DRAWINGS

The present invention will be more fully understood after a consideration of the following detailed description taken together with the drawing in which:

FIG. 4 shows a shifting circuit useful in the arithmetic unit of FIG. 2;

FIG. 5 shows a simplified representation of certain aspects of the arithmetic unit of FIG. 2;

FIG. 7 shows circuitry relating to an overlap feature incorporated in various registers and other elements in the circuit of FIG. 6;

DETAILED DESCRIPTION

Global Control Components

Figure 1:
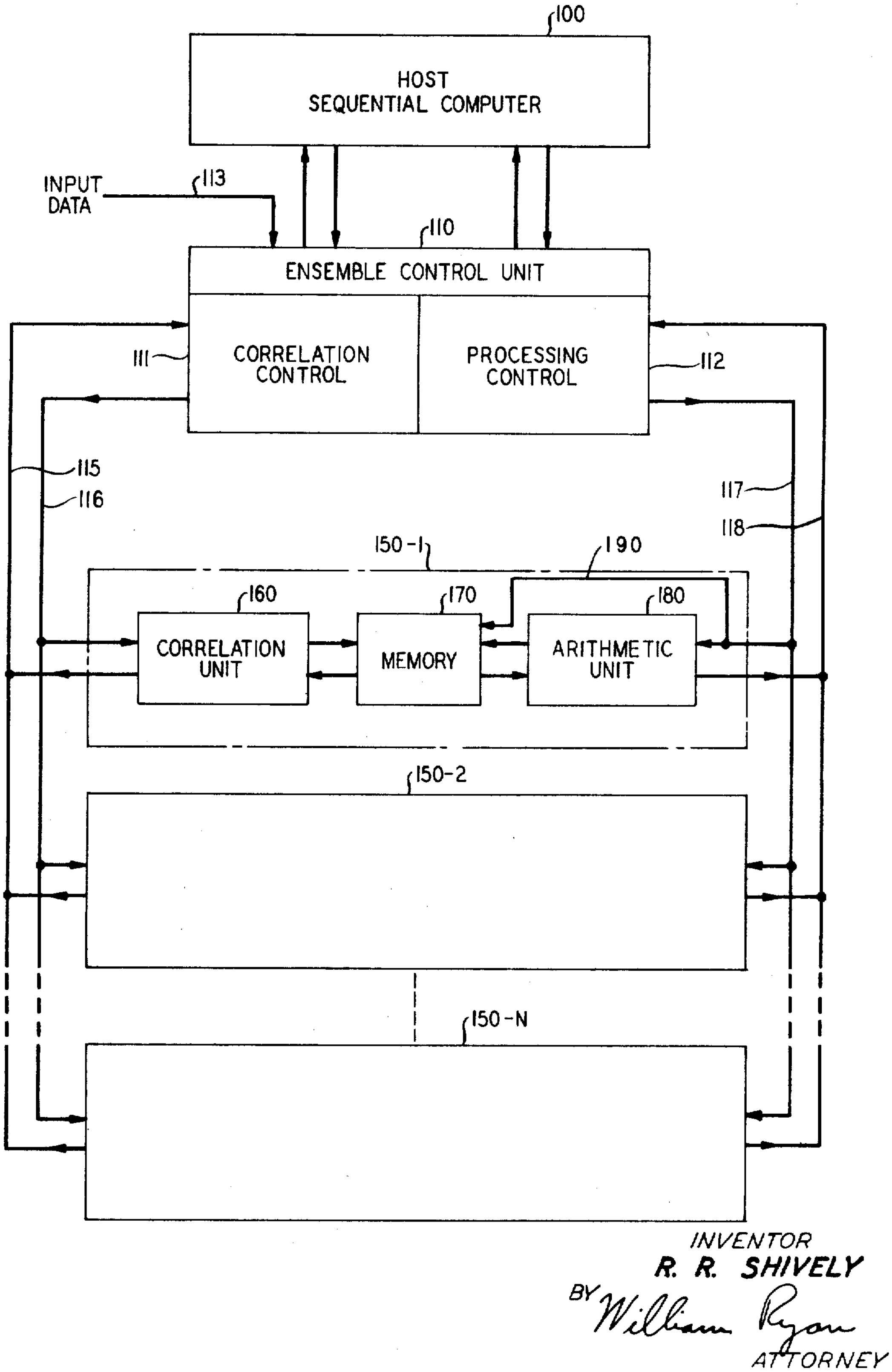
FIG. 1 shows a parallel ensemble of processing units.

FIG. 1 shows an overall representation of a parallel ensemble data processing system. Shown there is a "-host" computer 100 which typically takes the form of a general purpose sequential computer such as the IBM 360/65. Shown with the host computer is an ensemble control unit 110 which comprises two main portions, designated correlation control 111 and processing control 112. Ensemble control unit 110 is arranged to receive input data on lead 113 and data delivered under the control of host computer 100 to the common buses 115–118. Also shown in FIG. 1 is a plurality of processing elements 150–1 through 150–N. Each processing 150–i in turn comprises a correlation unit 160, a memory 170 and an arithmetic unit 180.

In typical application, the system of FIG. 1 is arranged to perform computations on data corresponding to a plurality of individual but related problems. In particular, if the data supplied on lead 113 represents radar returns from a radar system scanning the air space around an airport, for example, each of the processing elements 150–i may be dedicated to performing calculations and other processing corresponding to an individual target, i.e., aircraft or other object. These calculations typically involve range altitude, estimated fuel remaining and other such factors.

Other areas of application for the system of FIG. 1 include the processing of stock market data. In such an application, constantly updated transaction data are supplied on lead 113. Through an associated selection process, data corresponding to a transaction in the stock of a particular corporation are delivered to a particular processing element which is assigned on a permanent or semipermanent basis to processing stock market data relating to such corporation. A (typically repetitive) sequence of operations is then performed on all or some set including less than all of the stored data, e.g., that corresponding to the ten most active stocks. Such computations typically include the relationship of current prices to daily (and weekly, monthly, etc.) high and low prices, price-to-earnings ratios and similar variables.

Still another broad area of application for a computer configuration such as that shown in FIG. 1 is that relating to the control of the selection and maintenance of communication links. Thus, for example, the computer shown in FIG. 1 may be used to supply the common control for a telephone switching system. In such an application, the processing elements are analogous to the "markers" or other replicated common control equipment previously used to control the establishing of a required switching connection through a central office or the like.

The system of FIG. 1 offers the possibility of expanding system capability by merely adding additional processing elements to the ensemble of processing elements 150–1 through 150–N, i.e., N may be increased as more aircraft, stocks, telephone subscribers or the like are to be treated or served. In so expanding the capabilities of FIG. 1, little or no modifications need be made to the host computer 100 and only modest changes need be made to the ensemble control unit 110.

In one illustrative embodiment, the system in FIG. 1 is arranged to provide identical computations by one or more of the processing elements 150–*i* during a given interval. Thus, for example, the calculation of the velocity of all aircraft at an altitude at from 5 to 10 thousand feet, may be in progress at a given time. Only those processing elements 150–*i* associated with such aircraft will therefore participate in the computations during that period.

Host computer 100 conveniently stores the program steps for calculating such velocities (or any other desired data). These instructions are then conveniently read in sequence to ensemble control unit 110. Ensemble control unit 110 in turn decodes the instructions as they are received and generates detailed gating sequences. Host computer 100 remains available for processing programs which are essentially sequential in nature, for example, testing the results generated by an ensemble of processing elements 150–*i* against a number of predetermined criteria.

The N processing elements 150–1 through 150–N are termed an ensemble, as distinct from an array, because they make up a simple unstructured collection of indefinite number with no direct connections between the elements as are provided, for example, in ILLIAC IV system described in the Barnes et al paper, supra. Each element 150–*i* operates in parallel from the common buses 115–118. Individual elements participate in a particular computation or not in a manner dependent on the individual state of the processing element. This state is determined in large part by the information content in the memory 170 in the respective processing element. Thus, the memory 170 when taken together with parts of correlation unit 160 and arithmetic unit 180 in the respective processing element 150–i is said to be an associative memory. To illustrate using an example given above, data indicating an altitude of 5–10 thousand feed would therefore cause the processing element storing such data to participate in desired velocity computations. This associative property will be described further below.

Because of the ensemble arrangement, the machine is capable of operating on data corresponding to each of the aircraft (or other sources of data) simultaneously, and the processing time is not a direct function of the number of aircraft.

Correlation Unit

Correlation unit 160 is useful in those applications in which the data arriving at lead 113 originates with a number of independent sources, e.g., independently moving aircraft. Further, returns from a radar set arranged to scan the air space may include data corresponding to a number of such aircraft in rapid succession. It is convenient when processing data corresponding to a plurality of aircraft targets, for example, to assign an identification number to each such target. This number is then, temporarily at least, assigned to a given processing element. Correlation control unit 111 within the ensemble control unit 110 then directs data associated with this identification number to be entered on bus 116 where it is recognized by the appropriate correlation unit 160 and is ultimately stored in the appropriate one of the memories 170. Other possible methods of assigning incoming data to appropriate processing elements will occur to those skilled in the art.

Memory 170 may be of any standard form compatible with correlation unit 160 and arithmetic unit 180. In typical embodiment, the memory 170 comprises 512 words, each containing 32 bits. These 32-bit words may, of course, include more than one data item by using well-known packing techniques. Memory 170 is conveniently arranged to provide data to correlation unit 160 and arithmetic unit 180 on a cycle stealing basis, correlation unit 160 typically having priority because of its more pressing involvement with input data on bus 116.

Arithmetic Unit

Figure 2:
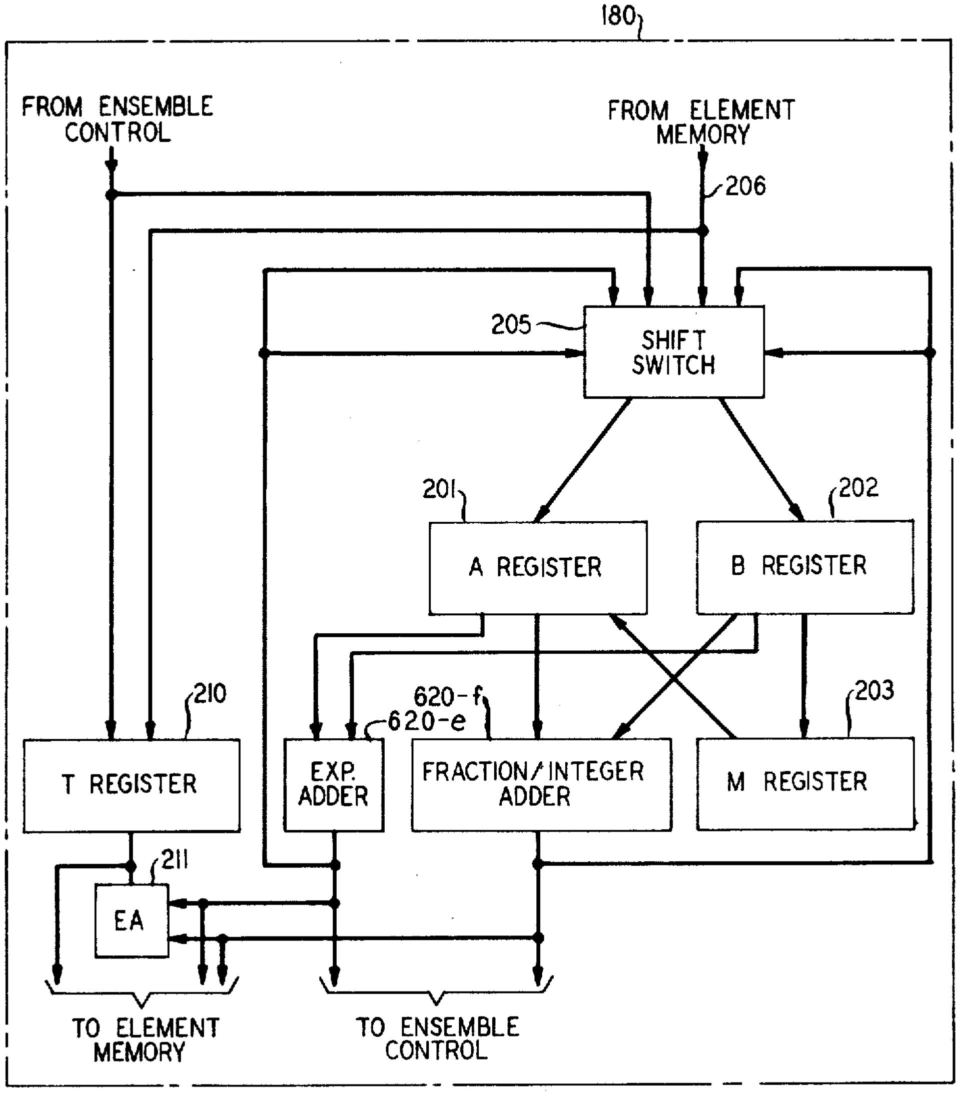
FIG. 2 shows a block diagram of an arithmetic unit useful in performing arithmetic operations in the system shown in FIG. 1.

FIG. 2 shows a block diagram of an arithmetic unit 180, useful in the overall system configuration shown in FIG. 1. As shown in FIG. 2, there are three principle registers in the arithmetic unit. These are the A register 201, the B register 202 and the M register 203. These are full word registers which, for the case of 32-bit memory words, will themselves provide storage for a 32-bit word.

The A register 201 is a standard accumulator of the type found in most general purpose computers. Also in typical manner, it is used to store the implicit second operand in the execution of single address instructions. The B register 202 is the explicit memory operand register into which data are entered upon a memory access. The M register 203 is used in multiplication and division as will be described below.

Before proceeding with a more detailed description of the arithmetic unit shown in FIG. 2, it is advantageous to consider the formats for data to be processed in processing element 150–i. For this purpose, it is useful to consider the word format shown in FIG. 3. As mentioned above, in typical embodiment the words in memory 170 in FIG. 1 are conveniently arranged to include 32 bits. To be efficiently and accurately processed by the arithmetic unit 180, the data stored in memory 170 are in floating point format. That is, the data have two independent components; these are the mantissa (or fraction) portion, and the exponent.

Figure 3:
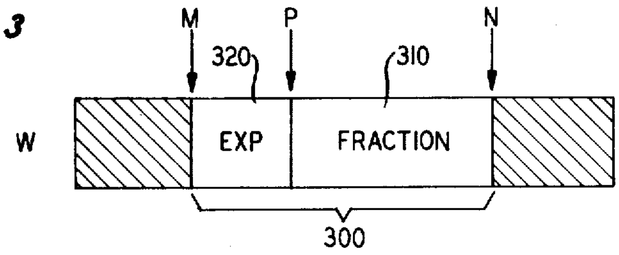
FIG. 3 shows a typical word stored in the memory associated with each arithmetic unit in FIG. 1.

FIG. 3 shows an entire data item 300 comprising a fractional portion 310 and an exponent portion 320. Thus, to specify a particular data item in memory 170, it is necessary to provide four items of information. These are: 1) the word location, indicated by W in FIG. 3; 2) the beginning point of the data item, i.e., the leading digit, shown as M in FIG. 3; 3) the last digit in the data item, shown as N in FIG. 3; and 4) the dividing point between the exponent and fraction portions of the data item, indicated by P in FIG. 3. It should be noted that, in general, the data item may include any number of bits up to maximum of 32 bits and the leading digit and the separation between the two components may occur at any convenient bit positions. It is required, of course, that for a given general format, e.g., the exponent to the left (toward more significant digit positions) of the fraction portion, the value M must indicate a higher order bit than does P.

The arithmetic unit 150–*i* is arranged to perform corresponding floating point operations on selected data fields having variable length in the respective processing elements.

The length of the exponent portion of a data item to be operated on is conveniently chosen to be any of 0 through eight bits, and the fraction length of any of 0 through 24 bits, inclusive of sign. A floating point number is automatically converted to a format of an 8-bit exponent and 24-bit fraction when read from memory. This is accomplished by aligning the radix point for the word read from memory with the boundary between the 8th and 9th bit from the left of a register (bits 7 and 8) and by masking the bits not in the selected data item.

The relative positioning of exponent and fraction is a logical sequel to the decision to have variable length formats. Exponent arithmetic is integer type, which means exponent values must be right-adjusted in the exponent field. A complementary convention applies to the left-adjusted fraction. Therefore any shift required to reposition a variable length floating point operand as it is read into the structured i.e., 8-bit exponent 24-bit fraction) arithmetic unit 180 applies identically to exponent and fraction if the former is on the left. The exponent-fraction combination shown in FIG. 3 can be shifted as if one number; this single operation shift aligns the boundary within the number with the exponent-fraction boundary (the boundary between bits 7 and 8) of the arithmetic unit 180.

The exponent base used in the floating point data items of the four shown in FIG. 3 is 2. Other computers have used higher bases, e.g., 8 or 16, to simplify hardware. The round-off error effects are often quite substantial when such bases are used. Thus double precision specification is more the rule than the exception in many scientific applications. Higher base exponents provide, in effect, a more coarse grid of scale factors to choose from. Each fractional overflow results in the loss of the equivalent of 4 (base 2) bits for a base 16 exponent. Only a single bit is lost when base 2 is used under the same circumstances.

Returning again to FIG. 2, it is noted that there is provided a shift switch (shifter) 205 intermediate both of registers A and B and sources of other data including, of course, input lead 206 which carries the inputs from the memory unit 170. Shift switch 205 provides for the shifting of input data items originating in data words retrieved from memory 170 and elsewhere through a lateral transformation of from 0 to 31 bits in a right or left direction. Details of the shift switch 205 are provided below.

The control register designated the T register and identified by the numeral 201 in FIG. 2 is an activity register which typically includes 8 bits whose contents may be determined by loading information from memory 170 or by logically operating on the contents of the A register 201. The contents of T register 210 provide an encoding of the processing elements activity state which, as each instruction is issued, is compared with an activity specification generated on bus 117 by the ensemble control unit 110. As the activity state broadcast matches the contents of the T register, a flip-flop 211 designated as EA in FIG. 2 is set. This has the effect of activating the processing element with regard to the execution of the common instruction then broadcast on bus 117.

Shifter

Shifter 205 is a combinatorial (or combinational) logic circuit used during the execution of an arithmetic operation for a number of different purposes, some of which were mentioned above. For example, during the floating point operation ADD, the arithmetic unit 180 of a processing element 150–*i* must shift data at three separate times. These shifts are required (a) to position data from the memory where it is stored in a packed format, (b) to effect radix point alignment before adding the addend to the augend, and (c) for purposes of normalizing the resulting sum. Operations other than the ADD operation also require shifts to accomplish particular functions.

The usefulness of shifter 205 is further demonstrated by considering the arithmetic operations required to perform floating point arithmetic. Specifically, it should be recognized that the statistics of floating point arithmetic can be invoked in the design of a single-processor computer to satisfy requirements for average execution times for instructions, even though worst case times may be much greater. Floating point addition/substraction is the primary example. The number of shifts prior to addition (for purposes of radix point alignment) is distributed near zero for a majority of programs, as described in Sweeney, "An Analysis of Floating Point Addition," IBM Systems Journal, vol. 4, No. 1 Jan. 1965), pp. 31–42. This merely reflects the fact that numbers being added tend to be of the same order of magnitude. Similarly, the average shift required to normalize the sum is small. In any case, if a shift greater than 1 precedes the addition, the normalization shift can be at most 1.

In contrast, the worst case is likely to occur in at least one processor in an ensemble such as that shown in FIG. 1 at every opportunity. The probability of a worst case every time increases with the size of the array. Since no upper limit exists to the number of processing elements 150–*i*, this probability can be assumed to approach 1. Floating point addition of two numbers with X-bit mantissas would therefore consume 2X steps for shifting alone, if only one-bit shifts were possible.

Thus, for reasons of avoiding the consumption of execution time in ancillary shift operations during arithmetic processing, and to accommodate the desired data packing in memory words in memory 170 a parallel shifter of the form shown in FIG. 4 is included. The shifter inputs are a 32-bit datum (at the top in FIG. 4) and 6 bits of shift information (at the left in FIG. 4). One of the 6 bits of shift information entered into shift decoder 410, 5 bits are for purposes of indicating shift distance and 1 for direction. The output at the bottom of FIG. 4 is the input datum shifted 0 to 31 bits in either direction. The term "parallel" shifter is intended to indicate that all of the bits of a selected datum are simultaneously shifted as a unit through the designated number of bit positions.

The delay through the shift switch is typically 6T, where T is the propagation delay of a single logical gate. Added logical circuits are provided where necessary to allow conditional sign extension as part of the shift. The shifter has three stages of AND–OR logic, each stage corresponding to a portion of the shift distance. Specifically, if shift distance D is represented in binary:

$$D = 2^4 \cdot d_4 + 2^3 d_3 + 2^2 d_2 + 2^1 d_1 + 2^0 d_0$$

then digits $(d_1, d_0)$ control the first stage, $(d_2, d_3)$ control the second, and $d_4$ controls the third. The first stage 420 shifts the input datum any of 0, 1, 2, or 3 positions; the second stage 430 shifts the output of the first any of 0, 4, 8, or 12 positions, and the final stage 440 shifts the output of the second stage by either 0 or 16 bit positions. A typical cell (building block) for the individual stages is given in FIG. 8 and will be discussed below.

SIMPLIFIED METHOD OF OPERATION OF THE ARITHMETIC UNIT

A simplified diagram of the arithmetic unit of FIG. 2 is given in FIG. 5. The identification numerals from FIG. 2 are retained. The A and B registers (201 and 202, respectively,) are the accumulator and memory operand register, respectively. B is transparent to the programmer (or system user), and A is the implicit second operand in the one-address instructions. Typical instruction sequencing is given in Table I which includes a listing of the order in which "edges" (i.e., interconnections) are used. Edge numbers are indicated in FIG. 5 by encircling them.

TABLE I

| Operations | Edges Used |
|---|---|
| LOAD A | 1, 2 |
| AND, OR | 1, 2 |
| INTEGER ADD | 1, 2; |
| | 3 AND 5, 6, 2 |
| FLOATING ADD | 1, 2; |
| | 3 AND 5; |
| | 3 OR 5, 6, 2 OR 4; |
| | 3 AND 5, 6, 2; |
| | 3, 6, 2 |
| STORE | 3, 6, 2; |
| | 3, 7 |

Each line (separated by a semicolon) indicates a separate step in the execution of the indicated operation.

LOAD A is defined to be the step of copying the addressed operand into register A. This requires conditioning edges 1 and 2 as indicated. The five steps listed for FLOATING ADD are: a) load operand, b) subtract exponents, c) shift the smaller of A and B back into itself, d) add, e) normalize. The simplified diagram and instruction sequencing illustrate how the shifter 205 is used both in series with memory and as part of the arithmetic loop. In the important FLOATING ADD instruction, three of the five steps (viz: first, third and fifth) make use of the fast shift capability.

Figure 6:
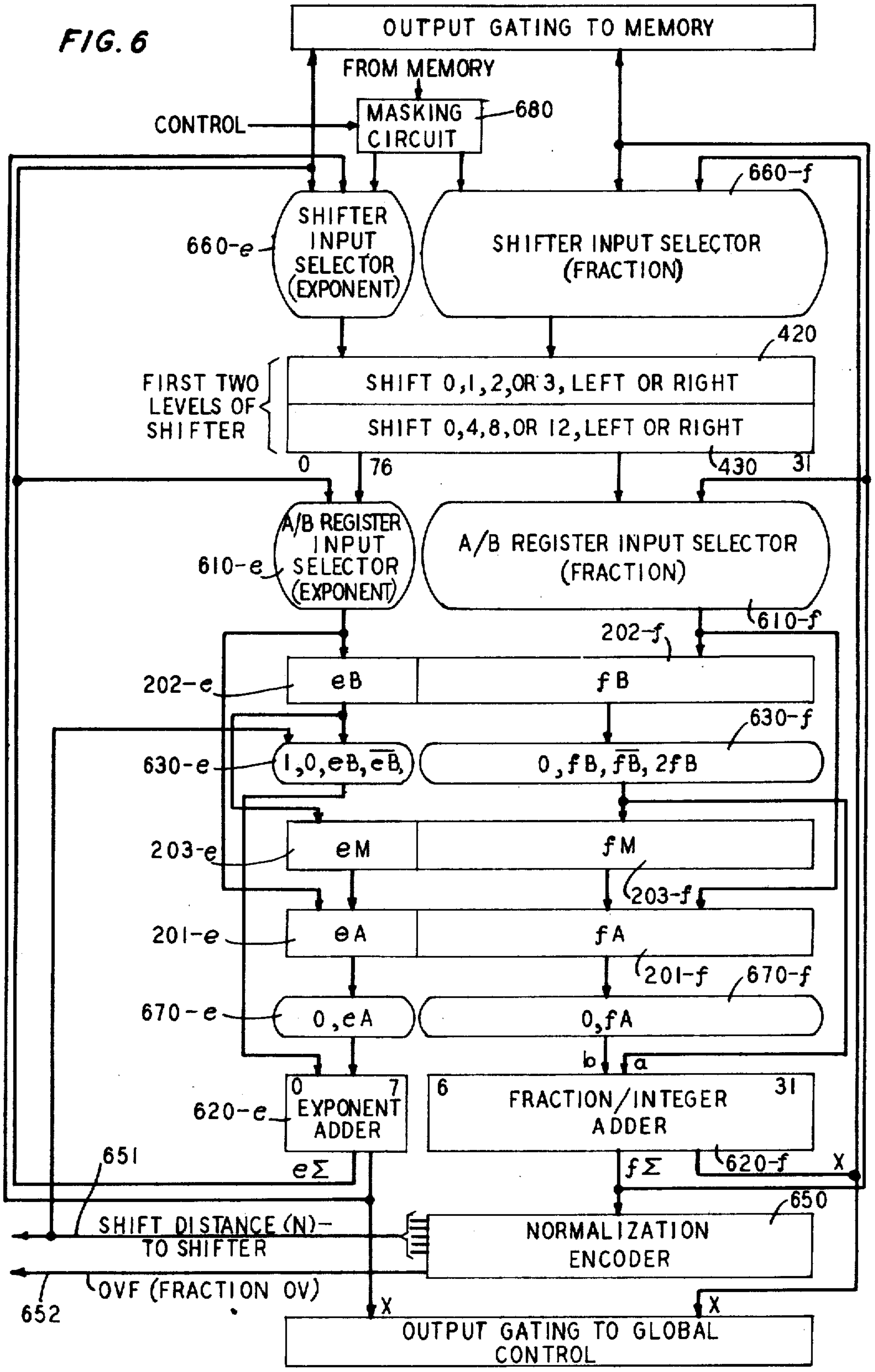
FIG. 6 shows a more detailed representation of the arithmetic unit of FIG. 2.

FIG. 6 shows many of the features of the arithmetic unit of FIGS. 2 and 5 in more detail. Where appropriate, identification numerals previously used are repeated for like elements in FIG. 6.

Oval shapes in FIG. 6 are used to denote selectors, i.e., multiplex elements where one of the several available inputs is selected as the output. Thus, for example, selectors 610–*e,f* (the selectors for the exponent and fraction portions of the registers A and B which may also be the third stage of shifter 205) are arranged to select from one of three possible inputs. These are:

1. The input from shifter 205 (or the first two stages of it). This is then either shifted 16 positions to the left or right or is passed directly to the A or B register, as appropriate.
2. The sum from the respective (exponent or fraction) portions of the adder, indicated by 620–*e* and 620–*f*, respectively in FIG. 6. In the case of the fraction, this sum is shifted two digit positions (divided by 4) upon selection.
3. A signal for continuing (extending) the sign bit through the remaining (otherwise unused) bit positions.

Figure 8:
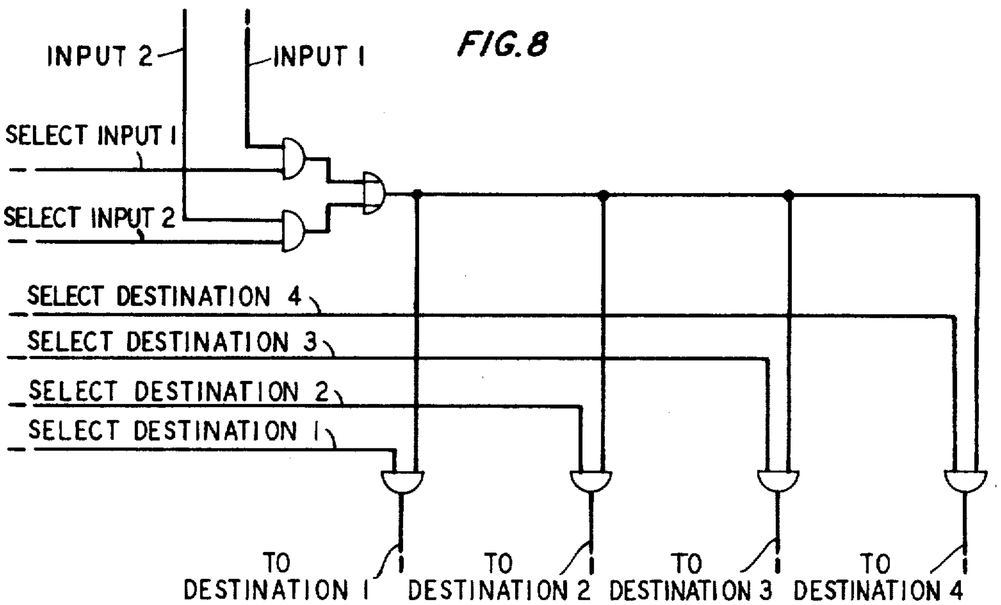
FIG. 8 shows a selector building block for use in the selectors shown in FIG. 6.

One embodiment of a selecting circuit is shown in FIG. 8. This circuit provides for selecting either of two inputs for delivery to any of 4 destinations. The extension of this to any number of inputs and any number of destinations is elementary. While the circuit of FIG. 8 provides for the shifting of one bit of an input, the parallel use of 32 of such circuits will readily provide selection of a full 32 bit word. When taken together with masking circuits (AND gates acting under global control) on the input to a 32-bit selector any portion of a packed data word may be shifted as a unit through the required shift distance. Two especially important observations with regard to FIG. 6 are:

1. The registers and adder are partitioned into distinct portions for the exponent and fraction. The identifying numerals 203–*e* and 203–*f* are used to identify the exponent and fraction portions of the M register, previously designated 203. This is extended to the other registers in FIG. 6.

It should be understood, for example, that selector 610–*e* performs selection with respect to the exponent portion of the A and B registers while selector 610–*f* performs similarly for the fraction portions.

2. The partitioned portions actually overlap. The eight exponent bit positions are denoted O through 7, but the fraction portion begins at bit position 6. This overlap feature is illustrated in further detail in FIG. 7, where there is shown two separate bit 6 and bit 7 storage devices (flip-flops or the like). The reason for the overlap is the need for overflow positions in the fraction since correction of fractional overflow is to be automatic. Two overflow bits are required because of the range of partial products during multiplication, which has been implemented using the well-known base 4 method. Characteristics of the arithmetic unit shown in FIG. 6 which are relevant to this overlap are as follows:

1. The shifter 205 is 32 bits wide, with bits numbered 6 and 7 time-shared between exponent and fraction at the output.
2. During fractional arithmetic, the sign of the fraction sum is conveniently extended indefinitely to the left. This is achieved by selecting the eight bit extension of the fraction as the exponent field input to the shift switch as well as forcing nodes at the left edge of the shift switch to the sign.
3. The apparent competition between exponent and fraction for use of the shared shift switch lines is resolved by providing a shift by-pass path for the exponent sum. This allows simultaneous exponent and fraction operations. The only occasion for selecting the exponent sum at the shift input is a logical shift, i.e., the 32 bits are to be treated as a logical array.
4. When a floating point number is loaded from memory, the fraction sign (in bit 8) is automatically copied into bits 6*f* and 7*f*.

The M register is for use in multiplication and division. Interconnections in M provide a right shift of two bits per step, and a left shift of one bit. Other connections to M are B as an input and A as an output. In the fraction field, the B fraction output selector is used as the M input; in the exponent field, the B register (flip-flop) outputs are used as shown in FIG. 6. The fraction connections permit left-shifting the multiplier in preparation for multiplication.

The shift distance in shifter 205 can be selected from any of a) a common bus from (global) ensemble control unit 110 b) the normalization encoder 650, and c) the output from exponent adder 620–*e*.

Adders 620–*e* and 620–*f* are standard adders and, in particular cases may assume the form shown in U. S. Pat. No. 3,517,173 issued June 23, 1970 to M. J. Gilmartin and R. R. Shively.

Normalization

It is desirable to maintain as many significant digits as possible throughout the course of an arithmetic sequence to enhance the precision of the final results. Thus, normalization of the results of an addition, for example, is of considerable value. Normalization generally is described in Bucholtz, Planning a Computer System, McGraw-Hill, 1962, especially Chapter 8.

The circuit of FIG. 6 includes a normalization encoder 650 to partially effect the desired normalization. In particular, normalization encoder 650 generates signals indicative of the required number of shifts to normalize the results from adder 620–*f*. It should be noted that the exponent addition, where needed, is basically a fixed point operation not requiring normalization. The coded indication of the number of bit positions through which the results must be shifted is applied to shifter 205 by way of lead 651 which actually effects the normalization. Lead 652 conveniently provides an indication of an overflow for the fraction sum. This is then used to effect the required 1 digit correcting shift.

As is usually the case for 2's complement arithmetic, it is desired to normalize a variable X so that $$\tfrac{1}{2} \leq X < 1$$

$$-1 \leq X < -\tfrac{1}{2}.$$

Thus, with a 1 sign bit indicating a negative fraction and a 0 a positive fraction, it is desired that $$0.100\ldots0 \leq X \leq 0.11\ldots1$$

$$1.00\ldots0 \leq X < 1.011\ldots1$$

In short, it may be said that in a normalized, 2's complement floating point representation, the digits to the immediate left and right of the radix point are different. Thus the problem of determining the number of digit positions through which an item is to be shifted in a normalizing shift, is reduced to that of measuring the number of digits between the sign bit and the first bit which is the complement of the sign bit. The circuit shown in FIG. 9 is particularly advantageous for performing this measurement.

Figure 9:
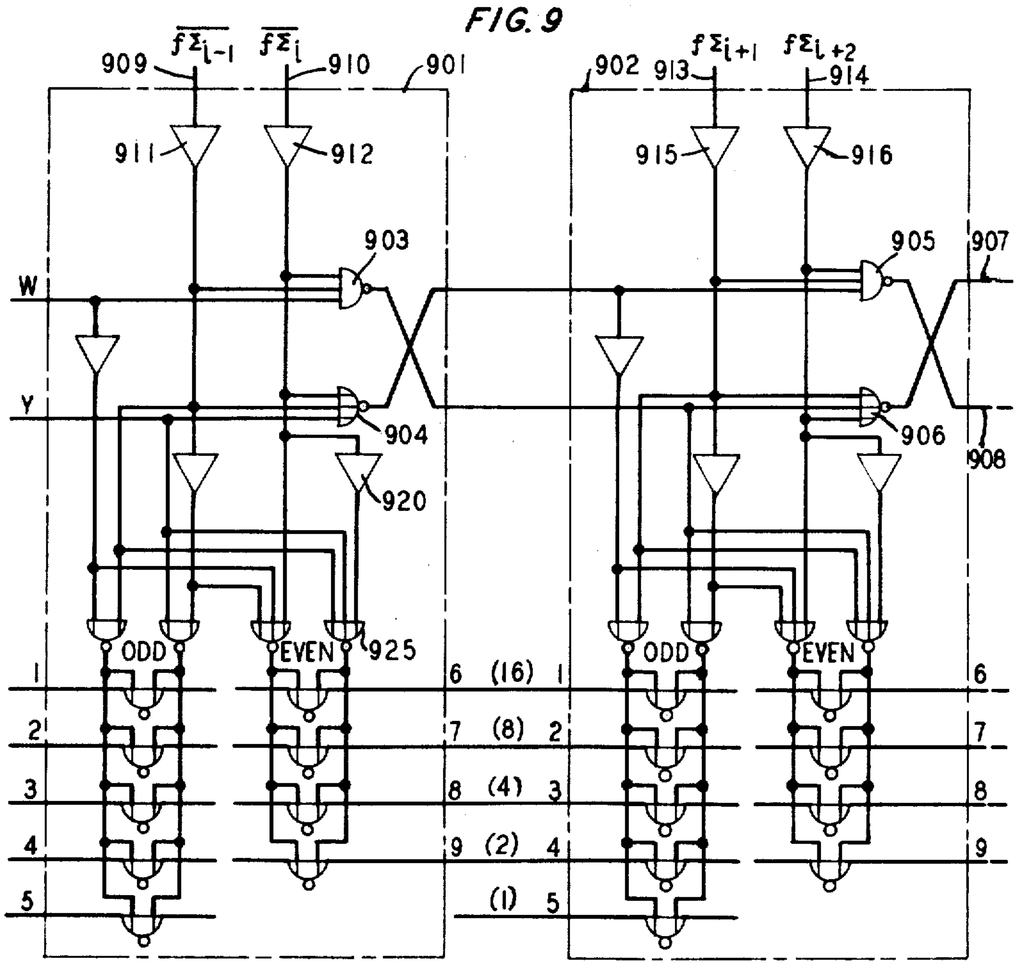
FIG. 9 shows a circuit for detecting and encoding an indication of the number of bits through which a data item need be shifted upon normalization.

FIG. 9 shows 4 bits of the normalization encoder 650, corresponding to bits $i-1$ through $i+2$ of the fraction sum from adder 620–*f* in FIG. 6. The inputs to these bits are in the case of bits $i-1$ and $i$ the complemented results of an addition as shown at the top of FIG. 9. For bits $i$ and $i+1$, the corresponding uncomplemented results are used.

Inputs at the left, labeled W and Y, indicate the status of bits to the left of the $(i-1)$th bit in the fraction. Thus, if a 1 signal appears on lead W, then all of the bit positions to the left are 1's. Similarly, if a 0 signal is present on the Y lead all 0's appear to the left. The pair of units 901 and 902 are repeated as often as required to span the full output from the fraction adder 620–*f*. By virtue of the crossings at the outputs of gates 903, 904, 905 and 906, the outputs on leads 907 and 908 may be used as the W and Y inputs, respectively, for the next pair of units 901 and 902.

Thus the basic arrangement of cascaded units such as those shown in FIG. 9 permits the continued propagation of a signal indicating no change in failure to disagree with the sign bit. When the first disagreement is noted, the column of 5 (for odd numbered bits) or 4 (for even numbered bits) NOR circuits associated with each adder output bit are arranged to connect the corresponding buses at the bottom of FIG. 9 to signals indicating the column number. Thus each of the buses at the bottom (shown connected for the units 901 and 902) provides one of the five signals representing the location of the leading digit which disagrees with the sign bit. These five buses (shown with assigned weights in parentheses) are the outputs from normalization encoder 650.

The connection of the column of NOR circuits associated with each adder bit to the buses numbered 1–5 (and 6–9 for the even numbered bits which are connected to the succeeding buses 1–5 as shown) is based on a straightforward encoding of the number of the adder bit. Thus the columns of NOR circuits connected to the output buses act as conditioned (by the adder bits) microprogrammed stores. The NOR circuits indicated in the columns are slightly atypical in form to permit economy of representation. Thus the horizontal line portion of the NOR circuits (connected to the buses) should be understood to be the output nodes which are selectively connected to the buses to effect the above-mentioned encoding.

A typical method of operation for the circuit of FIG. 9 will now be traced. Assuming a 0 sign bit, an indication of the first 1 bit in the adder output is sought. The first case treated will be that in which none of the 4 bits involved in FIG. 9 meets the test of being the first 1.

Thus a 0 signal on lead Y is combined with the 1 signals (the adder results are complemented) on leads 909 and 910 after they have been inverted by inverters 911 and 912, respectively. Thus the NORed output of gate 904 is a 1. This latter output is then ANDed with the 0 inputs on leads 913 and 914 as inverted by inverters 915 and 916, respectively. Thus all 1's are presented to gate 905 giving rise to a 0 output on lead 908. A similar analysis of the 1 signal on lead W will show that the failure to disagree with the sign (leftmost) bit causes the 1, 0 pattern on leads W and Y to propagate as mentioned above.

Suppose now a 0 signal appears as lead 910, for example, indicating the presence of a 1 at the adder output. This causes a 1 signal to appear at the output of inverter 912. This in turn causes the output of gate 904 to be a 0. The pattern of 1, 0 on leads W and Y, respectively, is therefore terminated. Further, the output of inverter 920 becomes a 0 and, because no 1's had been present at previous adder bits the Y input is 0 and the output of inverter 911 is 0, the output from NOR circuit 925 becomes a 1. This has the effect of causing the column of NOR circuits to be selectively connected to their corresponding buses, producing a 0 signal whenever it is desired to connect them. Thus if $f\Sigma_{11}$ (the 11th bit of the fraction sum) is the first sum bit to differ from the sign, the shift required is 2, or 11101 in binary one's complement form. Using the form, then, only the (weight 2) NOR circuit associated with bus 9 (or 4 in the notation of the following unit 902) would actually be connected to the bus at that bit position. Only 4 NORs are required in alternate columns.

Masking

In FIG. 6 there is shown a masking circuit 680 intermediate the memory input and the combined shifter 660–*e* and 660–*f*. This masking circuit is arranged to receive control signals from the ensemble control unit 110 which specify which bit positions are to be included in transferring a word from memory to the remainder of the arithmetic unit. This control information is used to enable those gates in a full word array of gates corresponding to the desired bits. Since this is a standard masking operation, no details of that circuitry are shown.

Element Control

As was mentioned above, control signals in the system of FIG. 1 originate with the host computer 100. By altering or selecting the program in host computer 100, it is possible to correspondingly affect the operation of each of the processing elements 150–1 through 150–N. To effect this control, however, it is necessary that an appropriate sequence of pulses be directed along the buses 115–118 in FIG. 1. These in turn activate, for example, the gates in the selector circuits part of which is shown in FIG. 8. While the detailed interconnection of each register, selector, etc., used in the arithmetic unit of FIG. 6 is not shown above, it is understood that the individual elements are, except as described, well known in the art. Thus the interconnection in the manner shown is straightforward.

The manner of operation of these elements under the control of gating signals from ensemble control unit 110 will now be further explained by means of an example. Thus, suppose it is required that a data item stored in the memory 170 of a selected group, perhaps all, of the processing elements shown in FIG. 1 is to be added to another such item. Assume these data items are identified as items 1 and 2 where item 1 is specified by $W = W_1$, $M = M_1$, $N = N_1$, $P = P_1$ and item 2 is specified by $W=W_2$, $M=M_2$, $N=N_2$, $P=P_2$.

In the hose computer 100, this addition will be indicated by a sequence of instructions such as 1. CLEAR REGISTER B
2. LOAD REGISTER B WITH ITEM 2
3. ADD THE CONTENTS OF REGISTER A TO THE CONTENTS OF REGISTER B, STORING THE RESULT IN REGISTER A.
4. RETURN THE CONTENTS OF REGISTER A TO THE HOST COMPUTER.

Figure 10:
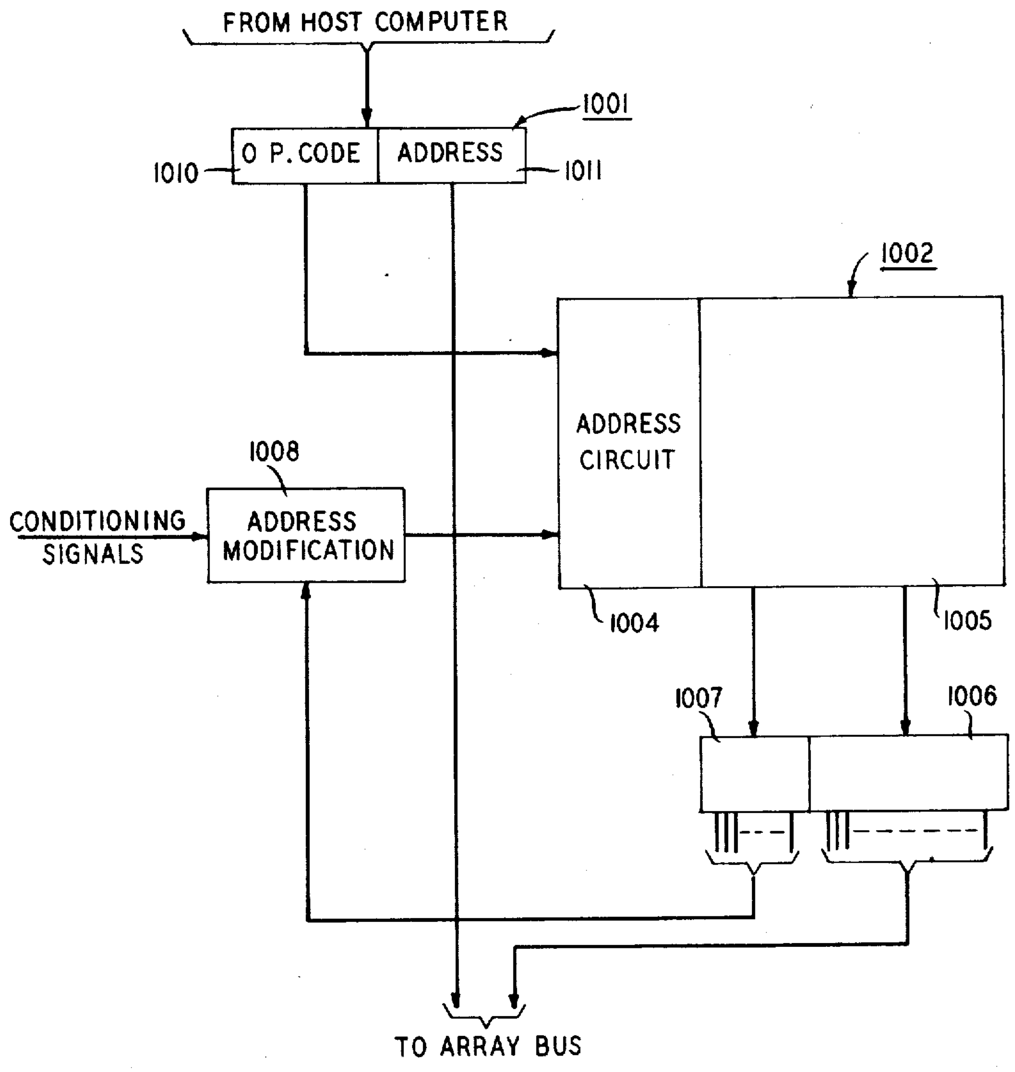
FIG. 10 shows in more detail the ensemble control portions of the circuit of FIG. 1.

A coded representation of each of the host computer steps which are to be execute by the array of processing elements is then delivered to processing (global) control unit 112 where a more extensive sequence of sets of control signals are generated. A more detailed view of processing control unit 112 is shown in FIG. 10. A substantially similar configuration may be used to generate control signals in correlation control unit 111.

FIG. 10 shows an input register 1001 having an operation code portion 1010 for storing a code representative of an instruction to be performed. Similarly, register 1001 has an address portion 1011 for temporarily storing data indicating an address in a processing element memory 170. It should be understood that this address specifies, in general, each of the 4 location parameters for a data item. The contents of register portion 1011 are typically passed directly to bus 117 for delivery by way of lead 190 in FIG. 1 to the memory access circuitry associated with memory 170 in FIG. 1 and masking circuit 680 in FIG. 6. In passing, it should be noted that each of the buses 115 through 118 contains a (usually large) number of control leads connected to the various selectors, memory access circuits and the like.

Also shown in FIG. 10 is a microprogrammed store 1002 having an address circuit portion 1004. This later portion is responsive to the signals contained in the operation code portion 1010 of register 1001 to select the multiplicity of signals associated with the first step in the execution of the designated operation. These signals are thus read from microprogram store 1005 into register 1006, thence to the array bus 117. These signals thus activate the gates, shifters and other selectors and the like in executing the steps of the desired operation.

Also read from store 1005 are other signals associated with the designated step, including signals representative of the location of the address in store 1005 of the signals for controlling the next step in the execution. These latter signals are then delivered to address modification circuit 1008 where, based on conditioning signals from the host computer, from real time inputs on lead 113 in FIG. 1, or from results of computations thus far completed by arithmetic unit 180, the indicated selection of the next step is modified if necessary.

By this means, any desired sequence of patterns of pulses are delivered on the various buses to the controlled portion of the arithmetic and correlation units in the array.

Returning then to the specific problem mentioned above, that of forming the floating point sum of data items 1 and 2, the steps involved (assuming item 1 has been loaded into the A register) are:

1. Address the memory word containing item 2 stored in memory 170. It should be recalled that this is supplied as one of parameters, $W_1$, specified by the host computer. 2. Condition the shifter comprising selector stages 420 and 430 and explicit selector 610 (610*e* and 610*f* treated as a unit) to position the operand (item 2) so that its radix point is properly aligned. This is effected under the control of the other address parameters supplied by host computer 100, as is the masking operation described above using masking circuit 680. Thus the second operand, item 2, is separately positioned and aligned in register B.

3. Under the control of additional sequencing signals read from microprogram store 1005 in processing control unit 112, the contents of register 202–*e* and 201–*e* are selected by selector 630–*e* and 670–*e*, respectively, for delivery to exponent adder 620–*e*. More exactly, $\overline{eB}$ (the complement of the contents of the exponent portion of the B register) is selected by selector 630–*e* and *eA* (the contents of the exponent portion of the A register) is selected by selector 670–*e*. Adder 620–*e* then forms the sum of these two numbers, i.e., the difference between the exponents of items 1 and 2.
4. The exponent difference formed in step 3 is then used to
   a. select at selector 660–*f* one of *fA* (The fraction portion of the contents of register A), fB (the fraction portion of the contents of register B), or 0 as the input to the shifter depending respectively on whether $0 \leq eA - eB < 23$, $-23 < eA - eB < 0$ or $|eA - eB| \leqq 23$;
   b. condition the shifter inputs (by way of input to shift the selected input right $|eA - eB|$ digit positions, while extending (entering) the sign bit into the unused bit positions; and
   c. gate the shifted number into the fraction portion of the register in which it originally appeared. It should be noted that by testing for the relative magnitude of the exponents and conditioning the shifter in this manner the required radix alignment is effected as one step rather than as a sequence of separate shifts as was previously the case in performing floating point arithmetic.
5. Again under the control of signals from processing control unit 112, selectors 630–*f* and 670–*f* are used to gate the aligned fractional operands to adder 620–*f* where the fractional sum is formed. This sum is then presented to normalization encoder 650 where it is processed as described above. The output leads of normalization encoder (shown as 651 in FIG. 6) are then used to again condition the shifter to perform the required normalization. This normalization is actually achieved in one continuous step as the outputs of adder 620–*f* are entered into register 201–*f*. Since the exponent of the sum is the larger of the two operand exponents the test in step 4 is used to determine whether the contents of register 202–*e* should be gated into register 201–*e* when $eB > eA$. The contents of the A register are the desired sum.

The above procedure is also applicable to floating point subtraction with only a different interpretation of results.

Further, since multiplication is merely repetitive additions accompanied by appropriate shiftings, all of the above procedures are used together with shifts in accordance with any of several well-known multiplication algorithms. Thus the application of the circuit of FIG. 6 (noting the availability of M register 203–*e* for use in the usual manner) TO multiplication is immediate.

Extensions

A straightforward extension of the above-described ensemble processing system is that providing for separate input ports to the several processors 150–*i*. Thus, for example, a sequence of centrally controlled operations may be performed on data entered directly to each of the individual memories 170. This greatly simplifies the correlation units 160.

Alternate forms for the combination of individual correlation units 160 and memories 170 (on a per processor basis) may also offer additional advantages. Thus, for example, any of the more common associative memory or distributed logic memory arrangements may replace the correlation unit-memory unit combination in appropriate cases.

Numerous and varied other modifications within the spirit and scope of the appended claims will occur to those skilled in the art.

What is claimed is:

1. A multiprocessor data processing system comprising a source of global control signals, and a plurality of arithmetic units responsive to said global control signals, said arithmetic units each comprising A. a memory for storing a plurality of operands, B. an adder for generating a sum signal representing the algebraic sum of pairs of operands having a predetermined format, C. a parallel shifter responsive to applied control signals for shifting at least one of said operands, said shifting being accomplished as a single step with substantially constant delay regardless of the extent of the required shift, thereby generating output operands having said predetermined format, and D. means for applying said output operands to said arithmetic unit.

2. A system as in claim 1 wherein said arithmetic units further comprise means for applying said sum signal to said adder in place of one of said two operands.

3. A system as in claim 1 wherein said arithmetic unit further comprises means for normalizing said sum signals.

4. A system as in claim 1 further comprising a source of normalization signals and wherein said shifter is responsive to said normalization signals.

5. A system as in claim 4 wherein said source of normalization signals comprises means for generating a coded representation of the number of digit positions between the sign digit and the most significant digit which is different from said sign digit.

6. A system as in claim 5 wherein said means for generating a coded representation comprises 1. a plurality of subunits each corresponding to given digit in said sum, said subunits each comprising A. means for applying an indication of the value of said given digit, B. means detecting a signal indicating that all digits having greater significance than said given digit do not differ from said sign bit, and C. means for generating output signals having first ordered values if said given digit is the same as said digits having greater significance, and having second ordered values if said given digit is different than said digits having greater significance, 2. means for applying said output signals for each subunit as inputs to the subunit corresponding to the next less significant digit in said sum.

7. Apparatus as in claim 5 further comprising in said means for generating coded representation A. a source of signals B. a plurality of output lines, and C. means responsive to said second ordered values for connecting said source of signals to selected ones of said output lines.

8. A system for adding first and second comprising

A. an adder for forming sum signals indicating the sum of applied operands,

B. a shifter for parallel shifting a word representing a number through a predetermined number of digit positions, said shifting being accomplished in parallel for all digits of said number and at a substantially constant rate regardless of the extent of the required shift, C. means for applying said numbers to said shifter in sequence, D. means for directing that said shifter perform a specified shift on each of said numbers thereby forming first and second shifted numbers, and E. means for applying said first and second shifted numbers to said adder.

9. A system according to claim 8 further comprising

A. a normalizing circuit for generating normalizing signals indicating the number digit positions through which a number must shifted to conform to a standard format, B. means for applying said sum signals to said normalizing circuit, and C. means for applying said normalizing signals corresponding to said sum signals to said shifter, D. means for applying said sum to said shifter, whereby said shifter generates an output signal corresponding to a normalized version of said sum signals.

10. A computer system comprising a plurality of processing units each comprising 1. means for forming the sum of two numbers 2. means for normalizing said sum independently of processing in any other processing unit, said normalizing being effected in respective ones of said processing units regardless of the extent of normalization required.

11. A system as in claim 10 wherein said means for normalizing includes a parallel shifter responsive to coded shift signals, and means for generating coded shift signals indicating the number of digit positions through which said sum must be shifted to effect normalization of said sum.

* * * * *

UNITED STATES PATENT OFFICE
CERTIFICATE OF CORRECTION

Patent No. 3,701,976 Dated October 31, 1972

Inventor(s) Richard Robert Shively

It is certified that error appears in the above-identified patent and that said Letters Patent are hereby corrected as shown below:

Column 4, line 18, after "processing" insert -- element --. line 17, before "i.e.," insert -- ( --; and line 50, "201" should read -- 210 --. Column 8, line 47, delete "One" and start a new sentence with "Of". Column 13, line 56, "hose" should read -- host --. Column 15, line 21, "$\leqq$23" should read -- $\geqq$23 --. Column 17, line 5, after "second" insert -- numbers --; line 24, after "must" insert -- be --.

Signed and sealed this 1st day of May 1973.

(SEAL)
Attest:

EDWARD M.FLETCHER,JR.
Attesting Officer

ROBERT GOTTSCHALK
Commissioner of Patents